Oct. 3, 1944. L. S. WILLIAMS 2,359,721
WEIGHING SCALE
Filed July 26, 1943 3 Sheets-Sheet 2
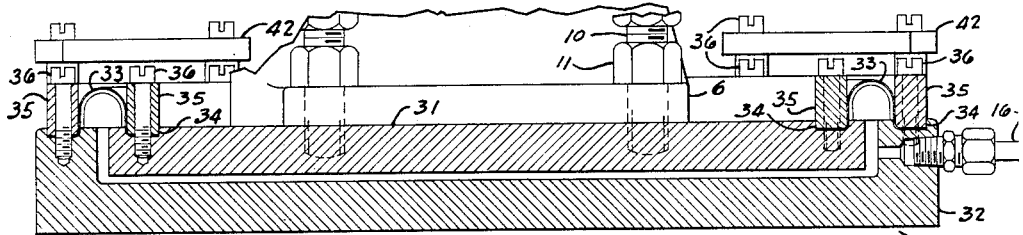
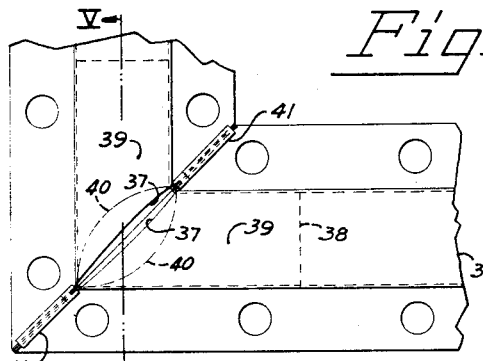
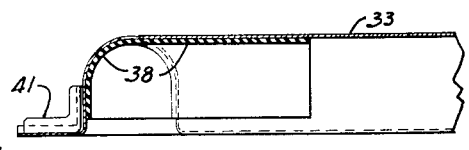
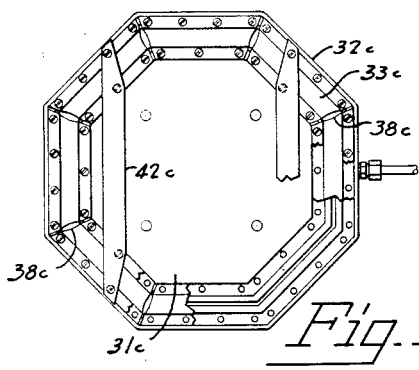
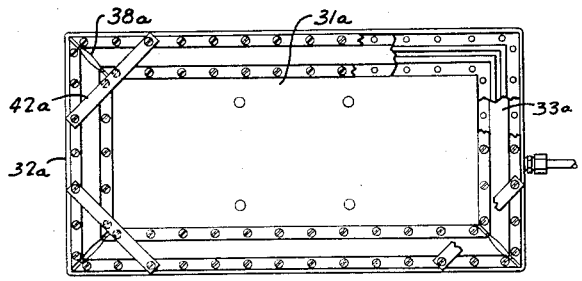
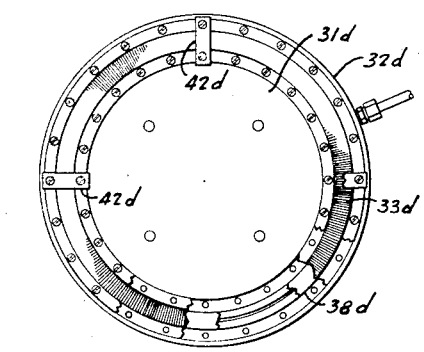
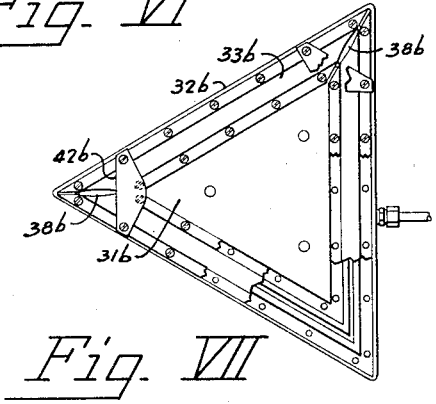
INVENTOR.
Lawrence S. Williams
BY
Marshall & Marshall
ATTORNEYS Oct. 3, 1944. L. S. WILLIAMS 2,359,721
WEIGHING SCALE
Filed July 26, 1943 3 Sheets-Sheet 3
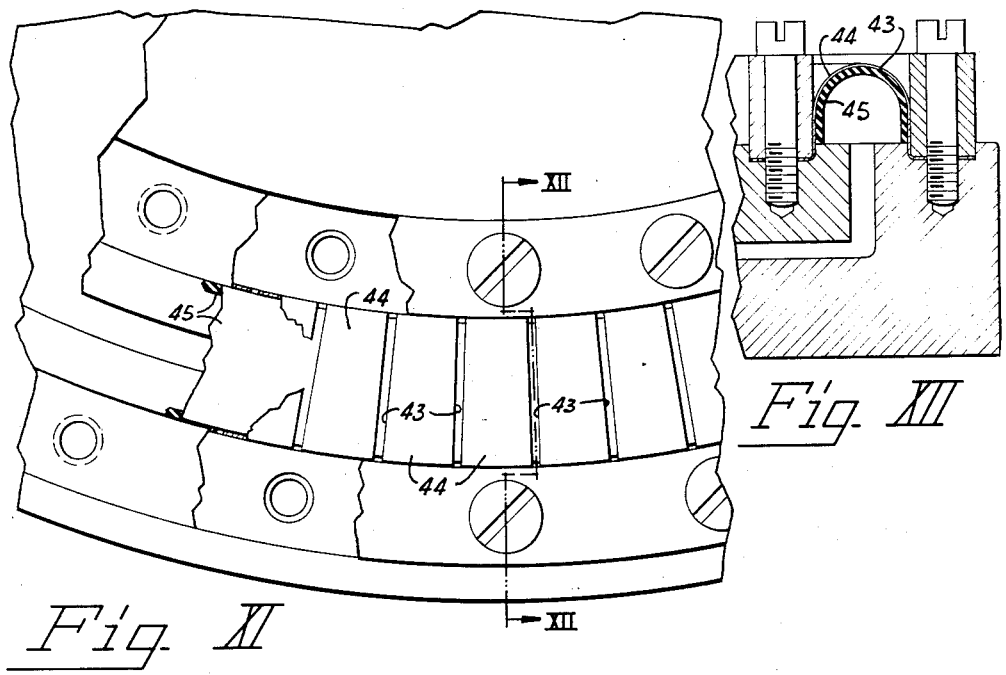
Fig. XI Fig. XII
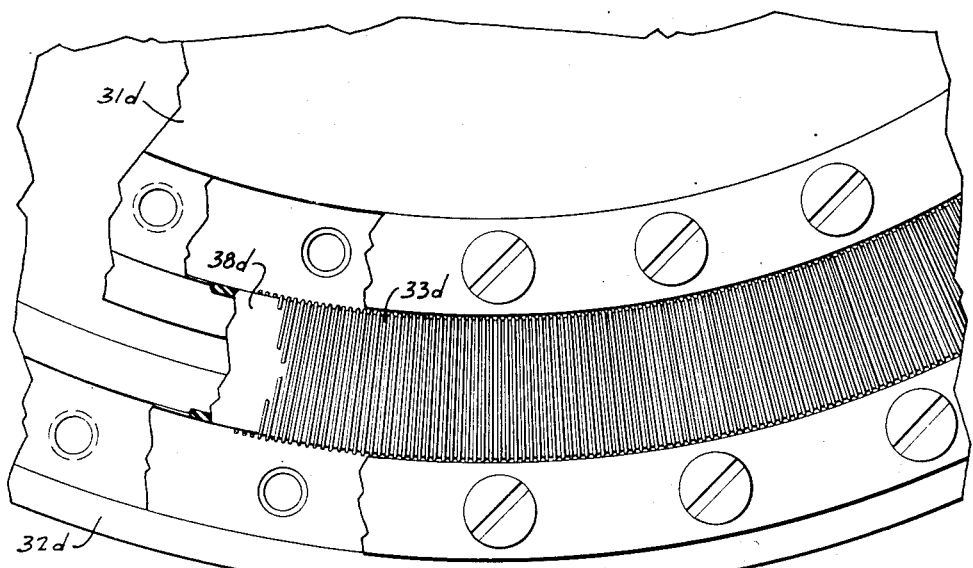
Fig. XIII
INVENTOR.
Lawrence S. Williams
BY
Marshall & Marshall
ATTORNEYS Patented Oct. 3, 1944

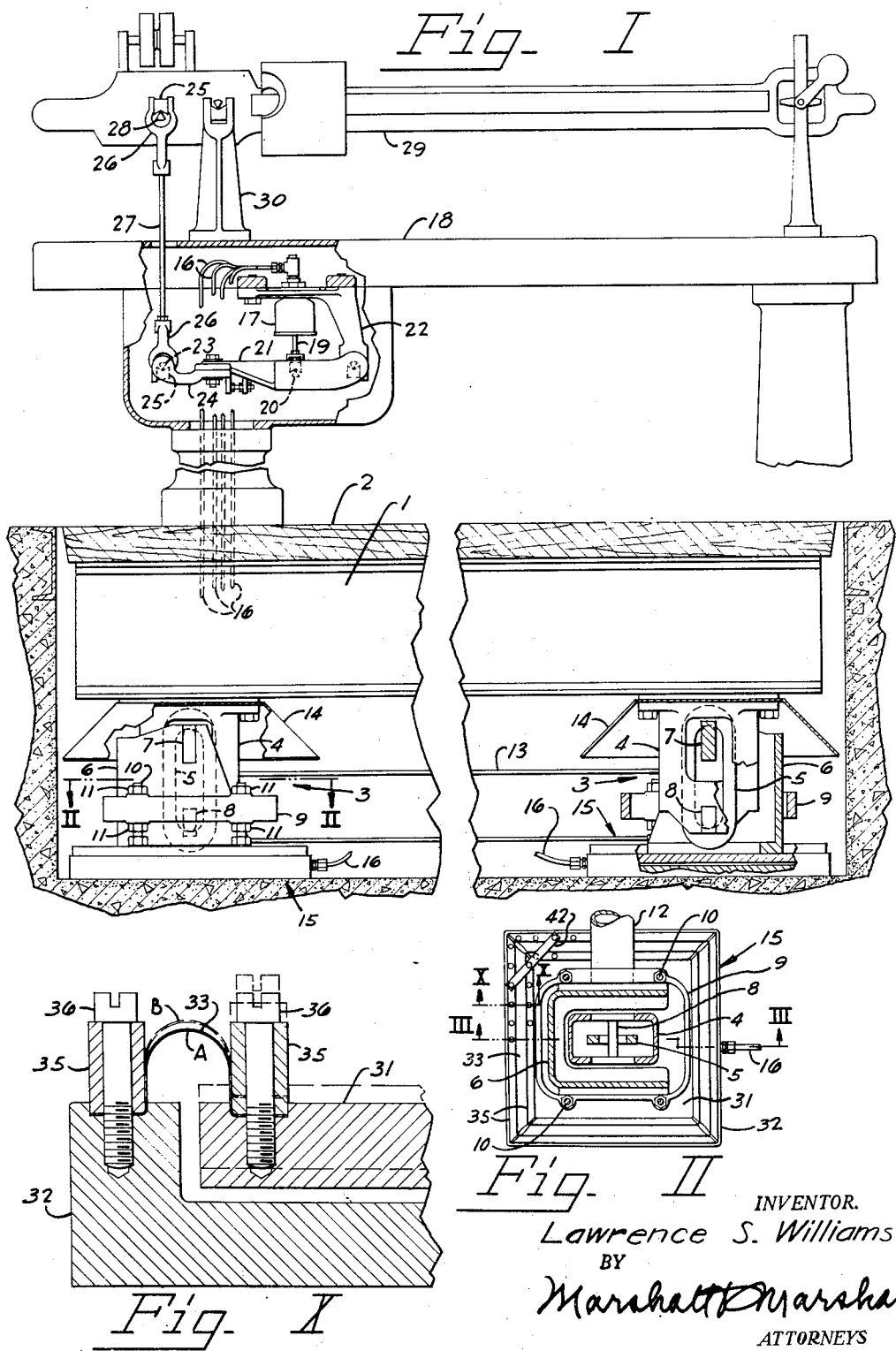

2,359,721

UNITED STATES PATENT OFFICE 2,359,721

WEIGHING SCALE

Lawrence S. Williams, Toledo, Ohio, assignor to Toledo Scale Company, Toledo, Ohio, a corporation of New Jersey Application July 26, 1943, Serial No. 496,114

12 Claims. (Cl. 265—47)

This invention relates to weighing scales of the type wherein force is transmitted from the load receiver to the counterbalance by hydraulic systems, and in particular to those elements, called capsules, of the hydraulic system which receive or transmit force and create proportional pressure in the hydraulic system.

To be satisfactory, any scale must meet two requirements. First, the ratio between the force exerted by a load on the load receiver and the force transmitted to the counterbalance must remain exactly constant in all positions to which the load and counterbalance may move and regardless of whether the increments of load are being added or removed. Second, the system composed of the load, the load receiver, the force transmitting elements and the counterbalance must be free to move so as to indicate small changes in the load or in the counterbalancing force.

In lever scales the first of these requirements is met by the precise adjustment of pivot distances and lever ratios, and the second by proper attention to the geometry of the scale and reduction of friction between the various elements.

These requirements apply equally well to scales employing hydraulic force transmission elements. The physical dimensions of the elements converting force to hydraulic pressure at the load receiver and hydraulic pressure to force at the counterbalance must be just as exact and reliable as pivot distances. Friction between the elements must be minimized, as well as any forces generated within the transmission elements themselves.

An ideal capsule, or hydraulic force-transmitting element, will reversibly convert mechanical forces into hydraulic pressures in an exactly constant proportion independently of the magnitude of the force applied. (In this respect it is analogous to a scale lever arm which converts a pull on a steelyard rod to an exactly equivalent turning moment about the lever fulcrum.) It will also accommodate movement, equivalent to lever oscillation, without introducing restoring effects of its own which variably contribute to the counterbalancing of the load.

The first hydraulic capsules employed flat circular diaphragms, the major portions of which were covered by flat circular plates, thus limiting the flexing to relatively narrow annular rings. This type of diaphragm was relatively stiff since deflection was resisted by both bending and stretching of the diaphragm. In later constructions the diaphragms were molded to form beads between the pressure applying plates and the surrounding rims. Such a diaphragm, although better, was still quite stiff. The bead portion constituted a guided half torus and resisted deflection in the same manner that an inflated automobile inner tube resists being turned rim side out.

These constructions applied to scales have the same effect as a spring acting against the motion of the levers. Such a spring contributes to the counterbalancing of the load and thus results in a scale accurate only as long as the relative position of the elements is maintained.

The object of this invention is to provide a hydraulic force transmitting element which will accommodate displacement with little or no contribution by itself to the support of the load.

Another object is to provide a hydraulic force-transmitting element which is mechanically free, and hydraulically rigid, i. e., in which deflection under load is resisted solely by the fluid pressure, and any deflection is accompanied by an equivalent flow of fluid into or from the chamber.

A still further object is to provide a hydraulic force-transmitting element whose effective area remains constant under load and displacement.

More specific objects and advantages are apparent from the description and drawings showing a preferred form of the invention adapted for use in a weighing scale.

In the drawings:

Fig. I is a front elevational view, partly in section, showing the general arrangement of the elements of a weighing scale employing hydraulic force transmission means.

Fig. II is a plan view of one of the hydraulic force-transmitting elements taken along the line II—II of Fig. I.

Fig. III is a sectional view of one of the capsules taken along the line III—III of Fig. II.

Fig. IV is an enlarged fragmentary plan view of one of the corners of a diaphragm as used in a rectangular capsule.

Fig. V is a sectional view taken along the line V—V of Fig. IV.

Fig. VI is a plan view of a rectangular capsule.

Fig. VII is a plan view of a triangular capsule.

Fig. VIII is a plan view of an octagonal capsule.

Fig. IX is a plan view of a circular capsule.

Fig. X is an enlarged fragmentary sectional view taken along the line X—X of Fig. II.

Fig. XI is an enlarged fragmentary plan view of another form of capsule diaphragm.

Fig. XII is a fragmentary sectional view taken along the line XII—XII of Fig. XI.

Fig. XIII is an enlarged fragmentary plan view of the circular capsule shown in Fig. IX.

These specific drawings and the accompanying description are intended merely as a disclosure and explanation of the invention and not as a limitation on the claims.

The general arrangement of the parts of a weighing scale employing hydraulic force-transmitting elements is shown in Figure I. A weighbridge 1 supporting a platform 2 is in turn supported on single-link suspensions 3. Each of the single-link suspensions comprises a yoke 4 depending from the weighbridge 1, a connecting link 5, and a chair-like member 6. The link 5 engages a bar 7 inserted in slots in the upper edge of the chair-like member 6 and a similar bar 8 retained in slots at the lower extremity of the yoke 4. This type of suspension allows horizontal movement of the weighbridge without exerting large shearing forces on the supports. The horizontal motion and the resulting angularity of connecting links 5, however, tends to tip the chair-like members 6. This tipping is restrained by a stabilizing frame having ring 9 adjustably secured to each chair-like member 6 by studs 10 and nuts 11.

The rings 9 surrounding the chair-like members 6 at each end of the weighbridge are rigidly connected by pipes 12. The pipes 12 are also joined by an I-beam 13 thus forming an H-shaped frame rigidly tying the rings 9 together and effectively preventing any tipping of the chair-like members 6. Dust shields 14 cover each of the suspensions 3 to protect them from falling dirt or debris.

The chair-like members 6 rest on hydraulic capsules 15 and the pressures thus created therein are transmitted hydraulically through tubes 16 to corresponding receiving chambers 17. The chambers 17 are rigidly attached to the under side of a weighbeam shelf 18. Bellows, not shown, mounted vertically inside the chambers 17 in a well known manner receive the hydraulic pressures on their outer surfaces and transmit corresponding forces to struts 19 bearing on pivots 20 mounted in a gathering lever 21. The gathering lever 21 is fulcrumed in a bracket 22 depending from the weighbeam shelf 18 and is provided with a power pivot 23 mounted in an adjustable nose iron 24.

The power pivot 23 is connected through bearings 25 held in clevises 26 attached to the ends of a rod 27 to a knife edge 28 mounted in a weighbeam 29. The weighbeam 29 is fulcrumed on a stand 30 bolted to the upper side of the weighbeam shelf 18 and is provided with the usual poises, counterweights and stops.

Each of the capsules 15 supporting the weighbridge 1 comprises a pressure plate 31 which acts as a force-transmitting member, a base 32 adapted to retain hydraulic fluid to react against the pressure plate 31 and thin metal diaphragms 33. The pressure plate 31 is a relatively stiff, square plate and has the chair-like member 6 of the associated link suspension secured to its upper surface. The base 32 is a flat casting or fabricated structure having a recess adapted to receive the pressure plate 31. The diaphragms 33 which confine the hydraulic fluid while allowing movement of the pressure plate 31 are clamped in narrow grooves 34 cut in the upper surface of the pressure plate 31 near and parallel to its edges and in the base 32, parallel to the edges of the recess, by steel bars 35 drawn down by a plurality of screws 36. The diaphragms have a free length (the dimension measured in going from the pressure plate to the base) greater than the distance between adjacent grooves 34 so that when assembled they arch upwardly to lie substantially in a cylindrical surface. The broad meaning of the term "cylindrical surface" is assumed and defined as describing a surface traced by a straight line or element moving parallel to a fixed line but not necessarily at a fixed distance therefrom. The diaphragms 33 extend continuously along each of the sides of the pressure plate 31 and are mitered at each of the corners to leave a narrow space extending diagonally from the corners of the pressure plate 31. Lines 37 of Fig. IV show the mitered cuts in the diaphragms 33 at one of the corners.

The spaces thus left between adjacent diaphragms 33 are sealed by pieces of sheet rubber 38 (a variety of universally flexible material) molded to conform to the interior of the corner and cemented or otherwise bonded to the diaphragms. To provide greater flexibility the rubber is not bonded near the edge of the diaphragm but the bonding is limited to the areas 39 beyond the lines 40.

Adjoining diaphragms 33 may be rigidly joined at those portions lying in the corners against the clamping bars 35. Fig. V illustrates one method of doing this. The diaphragms 33 are cut with excess material at the ends which is then turned up and soldered in clamps 41.

Excessive deflection of the pressure plate 31 is limited upwardly by stop bars 42 extending across the corners and secured to the base 32, and downwardly by contact between the pressure plate 31 and the bottom of the recess.

Although the square capsule, as described, is a preferred form, other forms may be constructed employing the same principles. It is possible to increase the lengths of two sides and thus obtain a rectangular capsule such as is shown in Fig. VI which comprises a rectangular pressure plate 31a, a base 32a having a rectangular recess, diaphragms 33a, rubber sealing members 38a and stop bars 42a.

In another version, one side of the capsule may be eliminated resulting in a triangular capsule such as is shown in Fig. VII. This form comprises a triangular pressure plate 31b, a base 32b having a triangular recess, diaphragms 33b, rubber sealing pieces 38b and stop bars 42b.

Or it may be advantageous to increase the number of joints to reduce the angle of each. Fig. VIII shows a capsule having an octagonal pressure plate 31c, a base 32c having an octagonal recess, diaphragms 33c, rubber sealing pieces 38c and stop bars 42c extending across portions of the pressure plate 31c.

The foregoing four forms are examples of a general class describable as a capsule having a polygonal pressure plate, a base having a similar polygonal recess adapted to receive the pressure plate, diaphragms forming cylindrical surfaces connecting adjacent sides of the pressure plate and containing recess, and sheet rubber pieces sealing the spaces at the junctions of the cylindrical surfaces to confine hydraulic fluid between the pressure plate and the base.

Just as the octagonal shape is obtained by doubling the number of sides of the square, so the number of sides may be still further increased. And just as a circle is the limiting form of a polygon as the number of sides is increased without limit, the limiting form of capsule is a circle as is shown in Fig. IX. The diaphragms 33 of the foregoing examples, which were of considerable width (the length of a side of the polygon), degenerate into flat wire (a form of filamentary material), which without change of function or result may be replaced by round wire. The sheets of molded rubber which were individual pieces, one at each joint, are replaced by a sheet of rubber molded into a split torus. (A torus is a geometrical surface similar to the surface of a doughnut or inflated automobile inner tube.) The rubber sheet underlying the wires is thus supported against stretching like a balloon by the wires overlying it and connecting the pressure plate to the base.

Fig. IX shows a capsule of this construction having a circular pressure plate 31d, a base 32d with a circular recess, diaphragms 33d in this case wires, sheet rubber sealing means 38d, and stop bars 42d.

One of the objects of this invention is to provide a hydraulic force-transmitting element which contributes little or no force to the counterbalancing of the load. One way of accomplishing this is to employ a material for the diaphragms which acts as a membrane. Since a membrane can resist forces in tension only, in the arrangements shown it can not contribute to the counterbalancing of the load. When hydraulic pressure is applied this statement, however, is strictly true only when the membrane lies substantially in a cylindrical surface.

Another way of accomplishing the same result is to make the diaphragms 33 of thin sheets of spring material. The sheets are originally flat and are resiliently deformed to the cylindrical shape as shown in Fig. X. The hydraulic pressure acting against the diaphragm forms it to a semi-circular cylinder with tangent portions lying against the clamping bars 35. Due to the resilient character of the spring material the curved portion of the diaphragm attempts to straighten out. The result is a horizontal force pushing against the side surfaces of the clamping bars 35. Since the diaphragm is flat when free, the portions lying tangent to the bars 35 are not stressed. Further, without a difference in bending moments at the points of tangency the diaphragm can exert no net upward or downward force on the pressure plate. Nothing has been said limiting the relative position of the pressure plate with respect to the base. Therefore, as long as the diaphragm has tangential unstressed portions lying against the clamping bars 35 no vertical force is exerted. Thus a highly elastic material like spring steel may be used with the same result as a membrane; namely, no net vertical force acting on the pressure plate.

Fig. X shows the pressure plate 31 in two positions and the corresponding positions of the diaphragm 33. The movement of the pressure plate moves the points of tangency half as far and stresses one portion of the diaphragm while relieving the stress in a corresponding portion on the other side.

It should be noted that if the diaphragms of spring material are permanently set to shape rather than resiliently deformed the motion of the pressure plate 31 indicated in Fig. X results in springing a straight portion to a curve on the pressure plate end, and a curved portion to a straight line at the other end. The pressure plate end in attempting to straighten pushes up on the element A and down on the pressure plate. The other end in attempting to regain its curvature pushes down on element A and thus on the pressure plate. These results are additive and produce a counterbalancing force not present if the diaphragm is resiliently formed from a flat spring sheet. In ordinary construction the magnitude of the counterbalancing force of the preformed resilient diaphragm, while greater than that of the resiliently deformed flat diaphragm, is insignificant when compared to the force exerted by a diaphragm of the prior art. The flat prior art diaphragm resists deflection by tension in its radial elements which produces a comparatively great counterbalancing force as the diaphragm attempts to assume a conical shape. The circular, beaded diaphragm, constructed to avoid the fault of the flat diaphragm, still is quite stiff due to the tension and compression forces produced as the diaphragm rolls in accommodating pressure plate movement. In contrast, the present diaphragms of generally cylindrical shape are stressed only by bending a thin section which requires very little force.

The spring diaphragms can not be rigidly joined at the corners without introducing a very material restoring effect resisting movement of the pressure plate. This is readily apparent when it is noticed that an element A at the middle of the curved cylindrical surface (Fig. X) has a horizontal motion equal to half the movement of the pressure plate 31. In the deflected position shown it has moved to position B. A similar action occurring in the adjacent cylindrical surfaces which are angularly disposed with respect to each other results in a spreading of the space between the ends of the respective elements indicated by the line 37 of Figure IV, as the pressure plate is raised. Thus, if the ends of the respective elements constituting adjacent diaphragms were rigidly connected, motion of the pressure plate would be resisted by tension or compression in the diaphragm material. This relative motion of the elements is allowed by the sheet rubber sealing pieces in the corners.

This type of diaphragm is also advantageous in achieving a constant effective capsule area, a major requirement when the capsules are used in weighing scales. As long as the condition of no bending moments at the tangent points is maintained, the cylindrical surface therebetween remains symmetrical regardless of load or deflection, and the effective area is constant.

Instead of making the diaphragm of a series of cylindrical surfaces, these may be approximated by spinning or stamping a bead in a flat annulus or circular sheet then sawing radial kerfs 43 through the curved part of the bead as indicated in Figs. XI and XII. The remaining portions 44 form a closely spaced series of diaphragms substantially cylindrically shaped. The radial kerfs 43 leave spaces which are sealed by sheet rubber bonded to the diaphragms on either side of the kerfs. Due to the narrow width of the strips 44 it is advantageous to mold a split torus 45 of sheet rubber and thus seal all the kerfs with one sheet.

Prior art diaphragms have been made with a similar bead but without the kerfs 43. These have exhibited high restoring spring effects due to the tensile and compressive forces exerted circumferentially in the beaded portion due to motion of the pressure plate. Considering a radial section through the bead as shown in Fig. XII and in particular that circumferential element lying at the uppermost part of the bead, a vertical movement of the pressure plate tends to cause a horizontal radial movement of the selected element changing its radius half the amount of the pressure plate movement. But such a radial movement changes the circumference of the element $2\pi$ times as much thus generating the mentioned tensile or compressive forces. These forces react to resist deflection of such prior art diaphragms, and in diaphragms of practicable dimensions the forces are so great as to cause important errors in weighing.

After the kerfs 43 are added the individual sections 44 may still retain their toroidal characteristics, however, the circumferential tensile or compressive forces can only act in each element individually and are reduced as the deformation of the strips varies the width of the kerfs.

As the force generated in resisting the circumferential deformation is a function of the width of the strips, it is a matter of design as to how far one may care to go in reducing the force by increasing the number of kerfs. As mentioned in connection with the circular capsule, the limit is reached when the strips become wires as shown in Figures IX and XIII.

If the diaphragm is stamped from a flat annular sheet it is possible to form it as a plurality of substantially cylindrical surfaces approximating a torus and then cut the kerfs through the transition points between the cylindrical surfaces. A diaphragm constructed in this manner is entirely free of the toroidal effects.

Thus, by the proper design and construction it is possible to build hydraulic capsules which, first, do not contribute to the support of the load through forces other than the hydraulic pressure, second, are hydraulically rigid, and third, retain a constant effective area regardless of load or deflection. The first and third effects are attained with diaphragms made either of membranes or spring material, the second effect, hydraulic rigidity, is better attained by the diaphragms of spring material since such a material is ordinarily much less stretchable than an equivalent membrane. Both materials are readily bendable, the membrane non-resiliently, and the spring material resiliently; both are essentially non-stretchable, the choice of one or the other materials being a matter of expediency.

The shape of the cooperating parts is such that the spring force of the spring diaphragms has little or no effect on the counter-balancing and thus allows the use of a relatively strong diaphragm material.

These improvements in design and construction produce a hydraulic capsule of sufficient accuracy and reliability to warrant its use in precision weighing scales.

Having described the invention, I claim:

1. A hydraulic force-transmitting capsule comprising, in combination, a force-transmitting member, means for retaining a hydraulic fluid to react upon the force-transmitting member, a plurality of closely-spaced, readily bendable but substantially non-stretchable lengths of material, a portion of each of said lengths connecting the force-transmitting member to the fluid retaining means and lying substantially in a cylindrical surface, and a universally flexible material sealing the spaces between said lengths to confine the fluid.

2. A hydraulic force-transmitting capsule comprising, in combination, a force-transmitting member, means for retaining a hydraulic fluid to react upon the force-transmitting member, a plurality of closely-spaced, readily bendable but substantially non-stretchable lengths of sheet material, a portion of each of said lengths connecting the force-transmitting member to the fluid retaining means and lying substantially in a cylindrical surface, and a universally flexible material sealing the spaces between said lengths to confine the fluid.

3. A hydraulic force-transmitting capsule comprising, in combination, a force-transmitting member, means for retaining a hydraulic fluid to react upon the force-transmitting member, a plurality of closely-spaced, readily bendable but substantially non-stretchable lengths of filamentary material, a portion of each of said lengths connecting the force-transmitting member to the fluid retaining means, and a universally flexible material sealing the spaces between and supported by said lengths to confine the fluid.

4. A hydraulic force-transmitting capsule comprising, in combination, a force-transmitting member, means for retaining a hydraulic fluid to react upon the force-transmitting member, the peripheries of said force-transmitting member and said fluid retaining means being polygons of equal number of sides, lengths of closely, spaced, readily bendable, substantially non-stretchable material connecting adjacent sides of said force-transmitting member and said fluid retaining means, and lying substantially in cylindrical surfaces therebetween, and a universally flexible material sealing the spaces between said lengths of material.

5. A hydraulic force-transmitting capsule comprising, in combination, a force-transmitting member, recessed means for retaining a hydraulic fluid to react upon the force-transmitting member, the peripheries of said force-transmitting member and said recess being polygons of equal number of sides, lengths of closely-spaced, readily bendable, substantially non-stretchable material connecting adjacent sides of said force-transmitting member and said fluid retaining means, and lying substantially in cylindrical surfaces therebetween, and a universally flexible material sealing the spaces between said lengths of material.

6. A hydraulic force-transmitting capsule comprising, in combination, a force-transmitting member, means for retaining a hydraulic fluid to react upon the force-transmitting member, said retaining means containing a recess the sides of which are a series of planes, said force-transmitting member being of polygonal shape and receivable in said recess, a plurality of resiliently bendable, substantially non-stretchable sheets of material connecting the sides of said force-transmitting means to adjacent sides of said retaining means, and lying substantially in cylindrical surfaces therebetween, and a universally flexible material sealing the spaces between said sheets of material to confine the hydraulic fluid.

7. A hydraulic force-transmitting capsule comprising, in combination, a polygonal force-transmitting member, means for retaining a hydraulic fluid to react against said force-transmitting member, readily bendable, substantially non-stretchable sheets of material connecting said force-transmitting member to said retaining means, and a universally flexible material sealing the spaces between said sheets of material to confine the fluid.

8. A hydraulic force-transmitting capsule comprising, in combination, a square force-transmitting member, means for retaining a hydraulic fluid to react against said force-transmitting member, readily bendable, substantially non-stretchable sheets of material connecting said force-transmitting member to said retaining means, and a universally flexible material sealing the spaces between said sheets of material to confine the fluid.

9. A hydraulic force-transmitting capsule comprising, in combination, a circular force-transmitting member, means for retaining a hydraulic fluid to react against said force-transmitting member, readily bendable, substantially non-stretchable filaments of material connecting said force-transmitting member to said retaining means, and a universally flexible material sealing the spaces between said filaments of material to confine the fluid.

10. A hydraulic force-transmitting capsule comprising, in combination, a polygonal force-transmitting member, means for retaining a hydraulic fluid to react aganist said force-transmitting member, said retaining means containing a polygonal recess, adapted to receive said force-transmitting member, resiliently bendable, substantially non-stretchable sheets of material connecting said force-transmitting member to said retaining means, said sheets initially flat, being resiliently constrained to a substantially cylindrical surface between the sides of said force-transmitting member and the walls of said recess, and a universally flexible material sealing the spaces between said sheets of material.

11. A hydraulic force-transmitting capsule comprising, in combination, a square force-transmitting member, means for retaining a hydraulic fluid to react against said force-transmitting member, said retaining means containing a square recess adapted to receive said transmitting member, resiliently bendable, substantially stretchable sheets of material connecting said force-transmitting member to said retaining means, said sheets, initially flat, being resiliently constrained to a substantially cylindrical surface between the sides of said force-transmitting member and the walls of said recess, and a universally flexible material sealing the spaces between said sheets of material.

12. A hydraulic force-transmitting capsule comprising, in combination, a circular force-transmitting member, means for retaining a hydraulic fluid to react against said force-transmitting member, said retaining means containing a circular recess adapted to receive said transmitting member, resiliently bendable, substantially non-stretchable filaments of material connecting said force-transmitting member to said retaining means, said filaments, initially straight, being resiliently constrained to a substantially cylindrical surface between the sides of said force-transmitting member and the walls of said recess, and a universally flexible material sealing the spaces between said filaments of material.

LAWRENCE S. WILLIAMS.